United States Patent
Loginov et al.

(10) Patent No.: US 8,278,906 B2
(45) Date of Patent: Oct. 2, 2012

(54) APPARATUS FOR SIMULATING THERMAL CONDUCTIVITY AND ELECTRICAL RESISTANCE OF DIAMONDS AND THEIR SUBSTITUTES

(75) Inventors: Boris Z. Loginov, San Diego, CA (US); Leonid Radomyshelsky, San Diego, CA (US)

(73) Assignee: Tri Electronics Inc., San Diego, CA (US)

( * ) Notice: Subject to any disclaimer, the term of this patent is extended or adjusted under 35 U.S.C. 154(b) by 105 days.

(21) Appl. No.: 12/838,111

(22) Filed: Jul. 16, 2010

(65) Prior Publication Data

US 2012/0013350 A1    Jan. 19, 2012

(51) Int. Cl.
*G01R 31/02* (2006.01)
*G01N 27/02* (2006.01)

(52) U.S. Cl. .......... 324/71.1; 324/693; 324/717
(58) Field of Classification Search ........... 324/71.1, 324/76.11, 693, 717
See application file for complete search history.

(56) References Cited

U.S. PATENT DOCUMENTS 4,255,962 A * 3/1981 Ashman .......... 374/10
2006/0087306 A1 * 4/2006 Loginov .......... 324/71.1
* cited by examiner

*Primary Examiner* — Vincent Q Nguyen
(74) *Attorney, Agent, or Firm* — Aleksandr Korzh

(57) ABSTRACT

The invention relates to substitutes of real gems for the purpose of calibrating of commercial diamond testers and for verification of their correct operation. Suggested apparatus consists of a set of objects, which are made of cheap materials like brass, stainless steel, and electrically conductive rubber, and which exhibit combination of thermal and electric conductivities typical for diamonds and their popular imitations like moissanites, cubic zirconia, and others.

3 Claims, 2 Drawing Sheets

APPARATUS FOR SIMULATING THERMAL CONDUCTIVITY AND ELECTRICAL RESISTANCE OF DIAMONDS AND THEIR SUBSTITUTES

BACKGROUND

Field

An embodiment of the invention relates to a device for examining the quality of diamonds as commonly necessary in the jewelry industry.

Commercial diamond testers detect real diamonds among their imitations, like moissanites or cubic zirconia, by measuring thermal and electrical conductivities of the gem. It is desirable to be able to verify operation of such tester on regular basis, say every day before using it. Such procedure requires having samples of gems, like a diamond, a few moissanites, and other gems and crystals. All these may cost a sizeable sum of money (cost of high quality carbides while less than that of diamonds still significant). Even if it is a justifiable expense, it may not be desirable to entrust such value to personnel working with inexpensive testers. The carbides are not a perfect standard for verifying functionality of a tester because their electrical resistance can vary significantly from one test to another, sometimes by an order of magnitude. Also, they can be sensitive to ambient light, which may reduce electrical resistance significantly. Besides, all necessary gems may simply not be at hand. A master set of inexpensive substitutes, which exhibit the combination of thermal and electrical conductivity typical for diamonds and their popular imitations would be useful, and could accompany each tester without substantially increasing the cost of the tester, thus alleviating the need for reference gems.

SUMMARY OF INVENTION

The invention describes how, using inexpensive materials, like brass, stainless steel, and electrically conductive rubber, to build objects, which exhibit combination of thermal and electrical conductivity typical for diamonds and their common imitations: moissanites, cubic zirconia, and other. A set of such objects in a convenient package is suggested as inexpensive substitute for real gems for the purpose of calibrating and/or testing commercial diamond testers, which determine true diamond by measuring thermal and electrical conductivity of the gem.

Diamonds possess very high thermal conductivity along with very low electrical conductivity, on par with insulators. Most natural diamond imitations show lower (e.g. white sapphires) or negligible (e.g. cubic zirconia) thermal conductivity. New high tech artificial gems, namely, silicon carbides, possess same high thermal conductivity as diamonds, but they have measurable electrical resistance ranging from tens of meg-ohms ($10^6$) to hundreds of Giga-ohms ($10^9$), even Tera-ohms ($10^{12}$).

In order to achieve desired physical properties it is suggested to sandwich metal with required thermal conductivity (e.g. brass for high conductivity, stainless steel for lower conductivity) with electrically conductive rubber which is manufactured for anti-static equipment and packaging and is made to have specified resistance ranging from hundreds of Mega-ohms to hundreds of Giga-ohms.

BRIEF DESCRIPTION OF THE DRAWINGS

Reference will be made to embodiments of the invention, examples of which may be illustrated in the accompanying figures. These figures are intended to be illustrative, not limiting.

The foregoing and other objects, features and advantages of the invention will be apparent from the following description of preferred embodiment of the invention, as illustrated in the accompanying drawings.

DETAILED DESCRIPTION OF THE INVENTION

Figure 1:
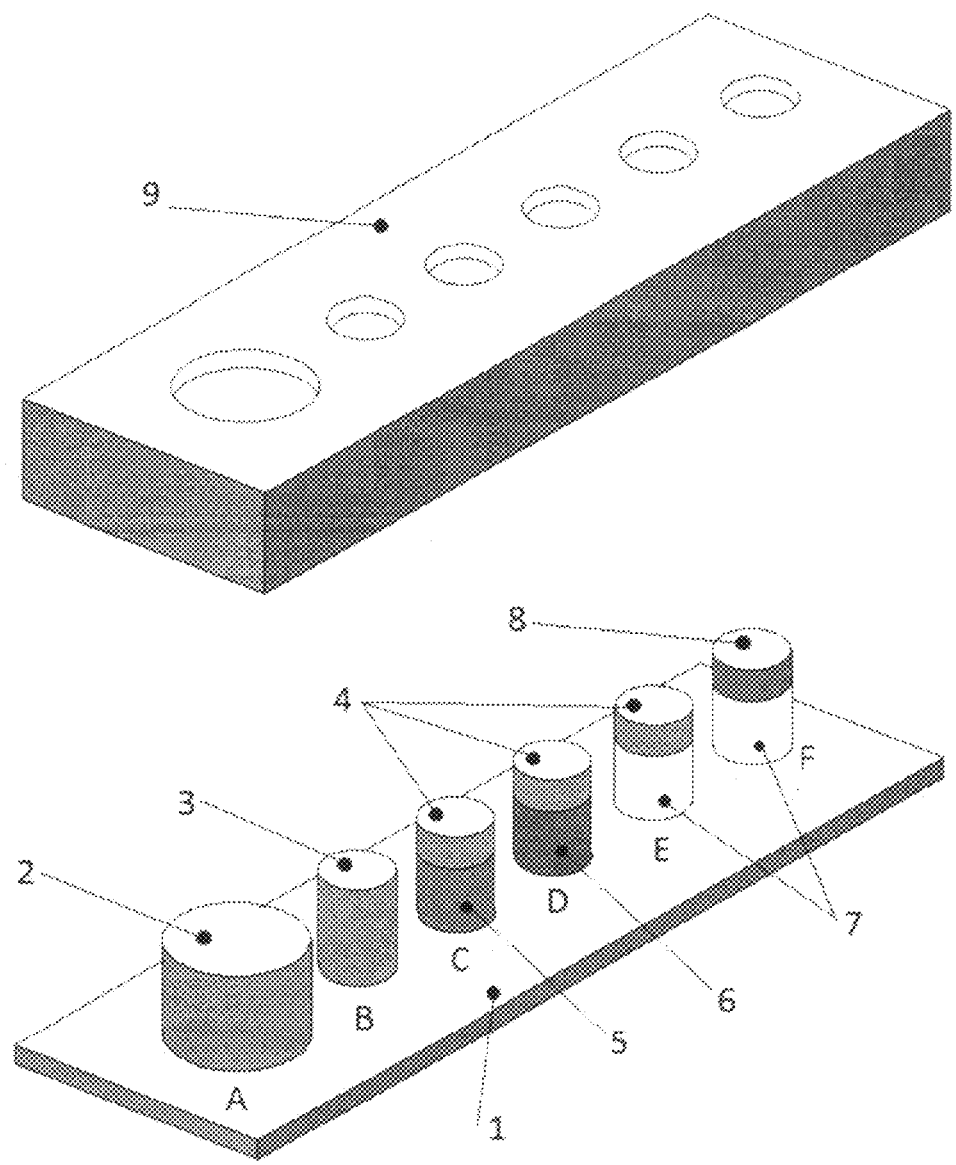
FIG. 1 shows the composition, structure, and design of the apparatus.

Purpose of this invention is to provide the way to build inexpensive physical objects that match certain properties, namely thermal and electrical conductivity, of diamonds and their popular imitations, like moissanites, cubic zirconia, white sapphires, etc. Such objects are useful for calibration and quality control of commercial diamond testers. Such testers typically detect real diamonds from imitations by measuring thermal and electrical conductivity of the gem. Thermal conductivity of diamonds is high, like that of such good conductor of heat as copper, while their electrical conductivity is negligible. Imitations of diamonds, except moissanites, have lower or even negligible thermal conductivity Moissanites have thermal conductivity on par with diamonds and are distinguished from diamonds by their electrical conductivity, which while low, resulting in resistance up to hundreds of Giga-ohms, is still measurable.

It is helpful to understand how a diamond tester is normally used. Typical tester looks like item 109 pictured in FIG. 2. It is held in one hand. If the tester was designed to perform electrical conductivity test, it has conductive pad 110 connected to a source of test voltage inside the device. Person using the tester holds the tester in one hand while touching the pad 110 with one finger 120. In the other hand the person holds, say, a metal ring with mounted gem. The probe 111 is designed to sense thermal conductivity of an object it touches, and also conducts electrical current. When the probe 111 touches an object, the heated probe cools down depending on thermal conductivity of the object. Electrical portion of the test is done through the circuit formed by the source of test voltage inside the tester, conductive pad 110, body 121 of the person, metal of the gem setting, the gem itself, and the probe 109. Electrical resistance of the gem is orders of magnitude larger than that of a human body, so that the body can be considered a conductor in this case.

The invention suggests achieving desired combination of physical properties by sandwiching a piece of material with desired electrical resistance between exposed top layer of material, which is a good electrical conductor and has required thermal conductivity and another electrical conductor on the bottom for closing electrical circuit. Inexpensive implementation of electrical resistance ranging from hundreds of Mega-ohms to hundreds of Giga-ohms can be effectively done by using a washer made of electrically conductive durathane, which is manufactured for antistatic equipment, for example.

Figure 2:
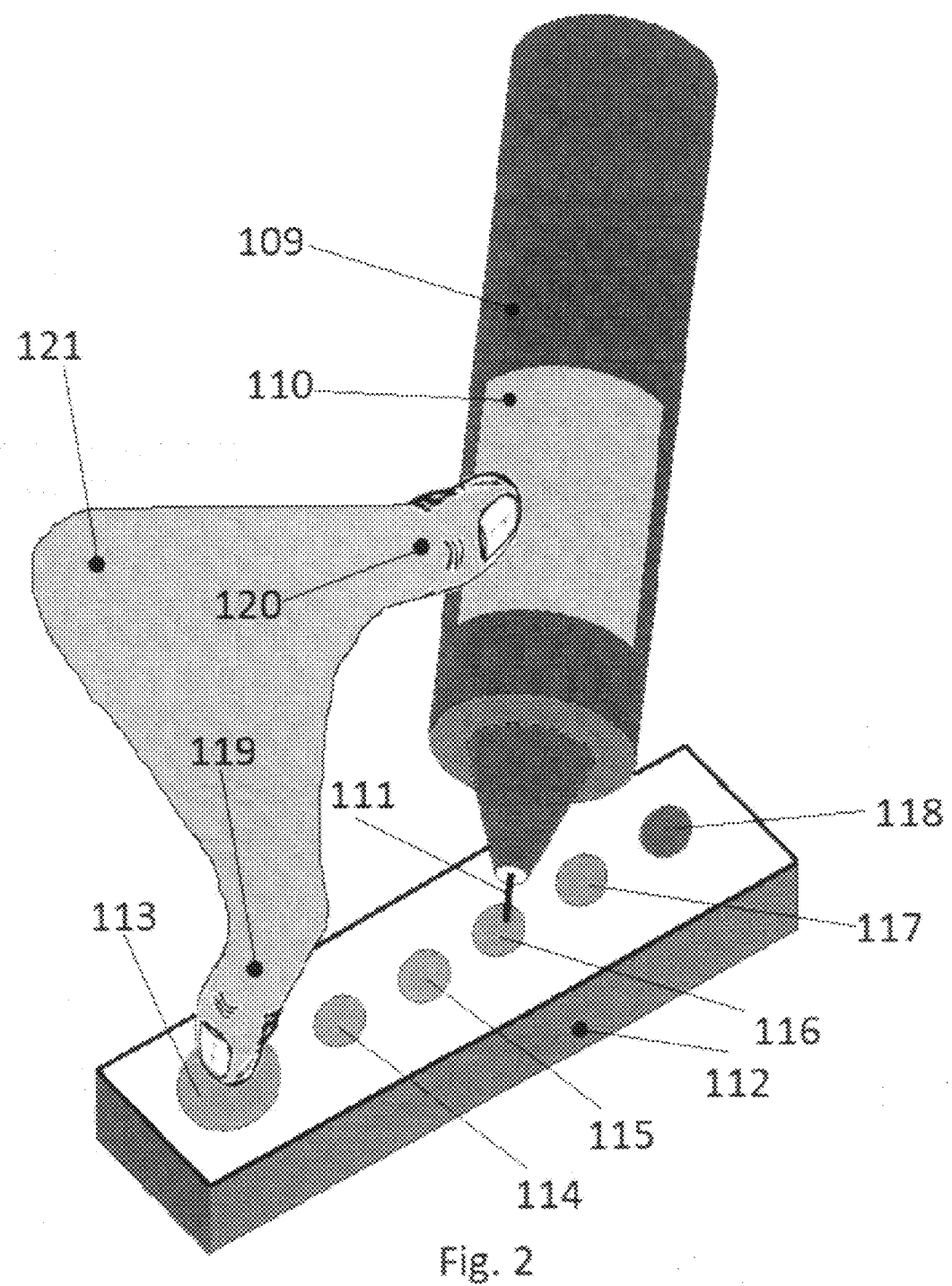
FIG. 2 shows how such apparatus is used to verify correct operation of a gem tester.

Centerpiece of the invention is a set of such 'sandwiches' C through F (FIG. 1) assembled on a base plate 1 made of a good electrical conductor, e.g. brass, as shown in FIG. 1. Electrically conductive metal column A (item 2 in FIG. 1), which touches the base plate 1 and is wide enough to rest a finger of the person using the set in order to close electrical circuit. Another metal column B (item 3 in FIG. 1) is provided to facilitate verifying ability of the tester to detect whether it touches metal setting instead of the gem. Columns B through F of FIG. 1, to be touched by the tester probe 111 in FIG. 2, provide various combinations of electrical and thermal conductivities as may be necessary to verify correct operation of a diamond tester with various gems. They are described in detail further down.

The column A is made of a conductive (metal) post 2 to be touched by a finger 19 of the person holding the tester, through whose body test voltage is conducted from the source inside the tester to the columns B through F; it must be wide enough to accommodate a human finger or thumb.

Column B is a conductive post 3 made of metal, and is used to verify that a tester detects correctly when metal gem setting is touched accidentally. Such ability is necessary in order to avoid electric shock to the user, which could result from applying high test voltage required for high resistance gems through a low-resistance circuit.

Columns C, D, and E each have on top metal disk 4 made of metal with high thermal conductivity as found in diamonds and moissanites. They differ, however, by their electrical resistance. That resistance is determined by the properties of material under the thermally and electrically conductive metal disk. Moissanites can have electrical resistance varying widely depending on manufacturing technology. 'Soft' moissanites with resistance from tens of Mega-ohms to a few Giga-ohms are detected without applying high test voltage. The column C imitates this variety of diamond substitutes. It uses plastic disk 5 with electrical resistance of a few Giga-ohms. 'Hard' moissanites can have electrical resistance reaching Tera-ohms and require high test voltage to measure it. These are imitated by the column D with plastic disk 6 having resistance of hundreds Giga-ohms. Column E imitates diamonds and uses a layer of insulating material (or air) 7 under the metal disk 4.

Column F imitates those diamond substitutes that have low thermal conductivity. It's electrically conductive top layer 8 is made of a material with low thermal conductivity, e.g. stainless steel, which rests on a layer 7 of insulating material, as such diamond substitutes do not require electrical conductivity test to be performed.

The enclosure 9, FIG. 1 has openings on top for access to metal pads 2, 3, 4, and 8, FIG. 1.

FIG. 2 shows the assembly of FIG. 1 enclosed in casing 112 so that only surfaces 113 through 118 of the columns A through F of FIG. 1, which need to be touched by probe 111 in the process of using, are exposed on top of the enclosure 112.

FIG. 2 explains the method of using the described apparatus with a typical diamond tester. While one finger 119 of the person doing the test rests on the exposed surface 113 with the other hand holding tester 109 and touching the conductive pad 110 with the other finger 120, the heated probe 111 of the diamond tester 109 touches exposed surfaces 114 through 118, one at a time. Body 121, FIG. 2 of the person serves as electric conductor closing the circuit through column 2, FIG. 1 and conductive base plate 1, FIG. 1. At each touch one operating mode of the tester being evaluated is checked.

Specific embodiments of the invention have been shown in the drawings and described in detail herein to help elucidate the invention concepts. It should be understood, however, that the invention is not to be limited to the particular forms disclosed; rather, the invention is to cover all modifications, equivalents, and alternatives falling within the scope of the following claims.

We claim:

1. An apparatus comprising a plurality of devices for simulating diamonds, moissanites and/or other gems commonly used as diamond imitations, each of the devices coupled to a single electrically conductive base member, and each of the devices having different thermal and electrical conductivity properties from the other devices, with each of the devices comprising:
    a first member made out of a material with predetermined thermal conductivity properties;
    a second member made out of a material with predetermined electrical conductivity properties;
    the two members coupled to form a sandwich;
the apparatus coupled via the conductive base member to an electrically conductive pad for applying test voltage via a finger of the person using it to verify operation of a gem tester known and used in the art, the apparatus being assembled in a compact block in a piece of electrically insulating material with low thermal conductivity.

2. The apparatus of claim 1 further placed in a protective casing, to prevent accumulation of moisture or other foreign substance on its surface, which could cause electrical leakage across the surface.

3. The method of verifying performance of a diamond tester or calibrating the diamond tester, which measures thermal and electrical conductivity, by using the apparatus of claim 2.

* * * * *